US007332109B2

(12) United States Patent
Senga et al.

(10) Patent No.: US 7,332,109 B2
(45) Date of Patent: *Feb. 19, 2008

(54) THERMALLY COLOR-DEVELOPING REVERSIBLY THERMOCHROMIC PIGMENT

(75) Inventors: Kuniyuki Senga, Nagoya (JP); Katsuyuki Fujita, Nagoya (JP); Shigehiro Koide, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 160 days.

This patent is subject to a terminal disclaimer.

(21) Appl. No.: 10/323,844

(22) Filed: Dec. 20, 2002

(65) Prior Publication Data

US 2003/0122113 A1 Jul. 3, 2003

(30) Foreign Application Priority Data

Dec. 27, 2001 (JP) .......................... P.2001-395841
Feb. 21, 2002 (JP) .......................... P.2002-045108

(51) Int. Cl.
*G02B 5/22* (2006.01)
*G02B 5/20* (2006.01)
*G02F 1/01* (2006.01)

(52) U.S. Cl. ....................... 252/586; 252/582; 252/583

(58) Field of Classification Search ................. 252/586
See application file for complete search history.

(56) References Cited

U.S. PATENT DOCUMENTS 4,920,991 A * 5/1990 Shibahashi et al. ........... 132/73
5,350,634 A * 9/1994 Sumii et al. ........... 428/402.21
5,527,385 A * 6/1996 Sumii et al. ............. 106/31.17
5,585,320 A 12/1996 Tsutsui et al.
5,721,059 A * 2/1998 Kito et al. .................. 428/522
5,919,404 A 7/1999 Fujita et al.
6,048,387 A * 4/2000 Shibahashi et al. ...... 106/31.21
6,165,234 A * 12/2000 Kanakkanatt ................ 44/275
6,485,824 B2 * 11/2002 Senga et al. ................ 428/323
6,494,950 B1 * 12/2002 Fujita et al. ................ 106/499
2002/0066890 A1 * 6/2002 Senga et al. ................ 252/500

FOREIGN PATENT DOCUMENTS

EP 0 873 881 A1 10/1998

* cited by examiner

*Primary Examiner*—Randy Gulakowski
*Assistant Examiner*—Timothy J. Kugel
(74) *Attorney, Agent, or Firm*—Sughrue Mion, PLLC

(57) ABSTRACT

A thermally color-developing reversibly thermochromic pigment which shows a uniform color density in the coloring temperature range and also shows an optimal ΔH value within a range of from 3 to 40° C. Thermally color-developing reversibly thermochromic pigments of a three component system having a ΔH value within a range of from 7 to 40° C. in which at least essential three components including (a) an electron-donating chromic organic compound, (b) a specified compound selected from the gallic acid esters and (c) a reaction medium selected from alcohols, esters, ketones and hydrocarbons; which reversibly generates color reactions of both of the compounds within a specified temperature range and has a melting point of less than 50° C., are microencapsulated, and of a four component system having a ΔH value within a range of from 3 to 25° C. in which a compound (d) selected from monomer compounds having a melting point of 50° C. or more or polymer compounds having a softening point of 70° C. or more is added to the three component system.

6 Claims, 4 Drawing Sheets

THERMALLY COLOR-DEVELOPING REVERSIBLY THERMOCHROMIC PIGMENT

FIELD OF THE INVENTION

This invention relates to a thermally color-developing reversibly thermochromic pigment. Particularly, it relates to a thermally color-developing microencapsulated thermochromic pigment capable of showing a colored state upon heating from a discolored state and returning to the discolored state upon cooling from the colored state.

BACKGROUND OF THE INVENTION

Some proposals have been made regarding a thermally color-developing reversibly thermochromic material (cf. FIG. 4) which shows a colored state upon heating from a discolored state and discolors upon cooling from the colored state within the life environmental temperature range (e.g., U.S. Pat. No. 5,919,404).

As shown in FIG. 4, this conventional thermally color-developing reversibly thermochromic material has a characteristic of having large variable color density within the coloring temperature range, showing a color-changing behavior in which the color density is drastically reduced at a high temperature side ($T_x$) bordering the complete coloration temperature ($T_2$) and drastically increased at a low temperature side reaching a decoloration initiation temperature ($T_3$).

SUMMARY OF THE INVENTION

By examining this type of thermally color-developing reversibly thermochromic material, the present inventors contemplated providing a thermally color-developing microencapsulated thermochromic pigment which has a small variable color density in the coloring temperature range, can freely construct a composition having an optimal ΔH value within a range of from 3 to 40° C. of the ΔH value (hysteresis temperature range) in the temperature-color density curve, illustratively within a range of from 7 to 40° C. as the ΔH value by a three component system, and capable of maintaining the colored state in a relatively broad specified temperature range even after removing the heat required for coloration (cf. FIG. 1), or a composition having a ΔH value within a range of from 3 to 25° C. effected by adding a fourth component to the three component system thereby narrowing the colored state keeping temperature range through shifting of the decoloration initiation temperature to a high temperature side, and capable of quickly returning to the original discolored state even after color development by a heating means without applying a special cooling means (cf. FIGS. 2 and 3), and further has excellent properties such as heat resistance, pressure resistance and shelf life with the passage of time and can express a desired thermal color change, and thereby developing its applications not only in the fields of temperature indication and temperature detection as a matter of course but also other fields, such as toys, teaching materials, various cards, food and drink containers, packing materials, household utensils, decorations and designing.

An embodiment of the invention is a thermally color-developing reversibly thermochromic pigment capable of showing a colored state upon heating from a discolored state and returning to the discolored state upon cooling from the colored state, which comprises at least (a) an electron-donating chromic organic compound, (b) an electron-accepting compound selected from gallic acid esters and (c) a reaction medium which reversibly generates color reactions of both of the compounds within a specified temperature range, which has a melting point of less than 50° C., and which is selected from the group consisting of alcohols, esters, ketones and hydrocarbons, wherein these three essential components are contained in microcapsules having an average particle diameter of from 0.5 to 50 μm and a ΔH value (hysteresis temperature range) in a temperature-color density curve is constructed such that an optional ΔH value can be freely selected within a range of from 3 to 40° C.

Another embodiment is a thermally color-developing reversibly thermochromic pigment, wherein the ΔH value (hysteresis temperature range) in a temperature-color density curve where the components (a), (b) and (c) are encapsulated is within a range of from 7 to 40° C. (cf. FIG. 1).

In still another embodiment, the ratio of component (b) to component (c) is from 20 to 80% by weight, component (c) is a joint use system of alcohols and esters wherein the ratio of alcohols/esters is from 80/20 to 20/80, and component (c) is a joint use system of alcohols and hydrocarbons wherein the weight ratio of alcohols/hydrocarbons is from 80/20 to 20/80.

A further embodiment of the present invention is a thermally color-developing reversibly thermochromic pigment, which further comprises, as a fourth component, a compound (d) selected from the group consisting of monomer compounds having a melting point of 50° C. or more and polymer compounds having a softening point of 70° C. or more, and the ΔH value (hysteresis temperature range) in the temperature-color density curve is within a range of from 3 to 25° C. (cf. FIG. 2).

In still a further embodiment, the ratio of component (d) to component (c) is from 0.4 to 20% by weight.

BRIEF DESCRIPTION OF THE DRAWINGS

By way of example and to make the description more clear, reference is made to the accompanying drawing in which.

Figure 1:
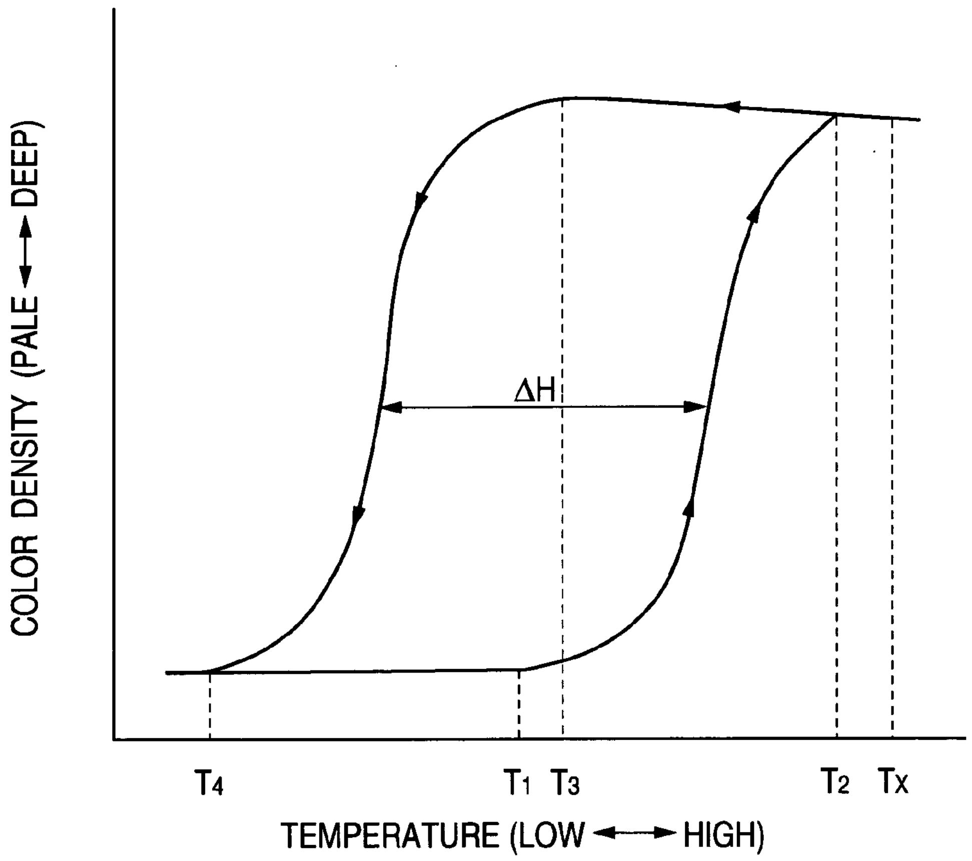
FIG. 1 shows a temperature-color density curve of the three component system ((a), (b) and (c)) among the thermally color-developing reversibly thermochromic pigments of the invention.

The Reference Signs have the following meanings.

$T_1$: coloration initiation temperature $T_2$: complete coloration temperature $T_3$: decoloration initiation temperature $T_4$: complete decoloration temperature $T_x$: high temperature region

DETAILED DESCRIPTION OF THE INVENTION

Examples of the electron-donating chromatic organic compound (a) include conventionally known compounds such as diphenylmethane phthalide derivatives, phenylindolyl phthalide derivatives, indolyl phthalide derivatives, diphenylmethane azaphthalide derivatives, phenylindolyl azaphthalide derivatives, fluoran derivatives, styrynoquinoline derivatives, and diaza-Rhodamine lactone derivatives, and their illustrative examples are shown below.

3,3-Bis(p-dimethylaminophenyl)-6-dimethylaminophthalide,
3-(4-diethylaminophenyl)-3-(1-ethyl-2-methylindol-3-yl) phthalide,
3,3-bis(1-n-butyl-2-methylindol-3-yl)phthalide,
3,3-bis(2-ethoxy-4-diethylaminophenyl)-4-azaphthalide,
3-[2-ethoxy-4-(N-ethylanilino)phenyl]-3-(1-ethyl-2-methylindol-3-yl)-4-azaphthalide,
3,6-dimethoxyfluoran,
3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroanilino)-6-di-n-butylaminofluoran,
2-(3-trifluoromethylanilino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methyl-6-di-n-butylaminofluoran,
2-xilidino-3-methyl-6-diethylaminofluoran,
1,2-benzo-6-diethylaminofluoran,
1,2-benzo-6-(N-ethyl-N-isobutylamino)fluoran,
1,2-benzo-6-(N-ethyl-N-isoamylamino)fluoran,
2-(3-methoxy-4-dodecoxystyryl)quinoline,
spiro[5H-(1)benzopyrano(2,3-d)pyrimidine-5,1'(3'H) isobenzofuran]-3'-one,
2-(diethylamino)-8-(diethylamino)-4-methyl-, spiro[5H-(1) benzopyrano(2,3-d)pyrimidine-5,1'(3'H)isobenzofuran]-3'-one,
2-(di-n-butylamino)-8-(diethylamino)-4-methyl-,
spiro[5H-(1)benzopyrano(2,3-d)pyrimidine-5,1'(3'H) isobenzofuran]-3'-one,
2-(di-n-butylamino)-8-(di-n-butylamino)-4-methyl-,
spiro[5H-(1)benzopyrano(2,3-d)pyrimidine-5,1'(3'H) isobenzofuran]-3'-one,
2-(di-n-butylamino)-8-(N-ethyl-N-1-amylamino)-4-methyl-, spiro[5H-(1)benzopyrano(2,3-d)pyrimidine-5,1'(3'H)isobenzofuran]-3'-one, and
2-(di-n-butylamino)-8-(di-n-butylamino)-4-phenyl.

Further examples include pyridine, quinazoline and bisquinazoline compounds which effective in developing a fluorescent, yellow to red color.

Examples of the electron-accepting compound (b) selected from gallic acid esters include dodecyl gallate, tridecyl gallate, tetradecyl gallate, pentadecyl gallate, hexadecyl gallate, octadecyl gallate, eicosyl gallate and behenyl gallate, which undergo electron-donating/accepting reaction with a compound selected from the component (a).

The reaction medium (c) functions as a reaction medium for generating the electron-donating/accepting reaction reversibly within a specified temperature range and is selected from alcohols, esters, ketones and hydrocarbons.

Examples of the alcohols include aliphatic monovalent saturated alcohols such as decyl alcohol, undecyl alcohol, dodecyl alcohol, tridecyl alcohol, tetradecyl alcohol, pentadecyl alcohol, hexadecyl alcohol and heptadecyl alcohol; aliphatic unsaturated alcohols such as allyl alcohol and oleyl alcohol; alicyclic alcohols such as cyclopentanol, cyclohexanol, cyclooctanol, cyclododecanol, and 4-tert-butylcyclohexanol; aromatic alcohols such as 4-methylbenzyl alcohol and benzhydrol; and polyhydric alcohols such as polyethylene glycol.

As the esters, esters having 10 or more carbon atoms are effective, and examples include esters obtained from optional combinations of aliphatic and aliphatic ring- or aromatic ring-containing monovalent carboxylic acids and aliphatic and aliphatic ring- or aromatic ring-containing monohydric alcohols, esters obtained from optional combinations of aliphatic and aliphatic ring- or aromatic ring-containing polyvalent carboxylic acids and aliphatic and aliphatic ring- or aromatic ring-containing monohydric alcohols and esters obtained from optional combinations of aliphatic and aliphatic ring- or aromatic ring-containing monovalent carboxylic acids and aliphatic and aliphatic ring- or aromatic ring-containing polyhydric alcohols, and their illustrative examples include ethyl caprylate, octyl caprylate, stearyl caprylate, myristyl caprate, cetyl caprate, stearyl caprate, 2-ethylhexyl laurate, n-decyl laurate, 3-methylbutyl myristate, isopropyl palmitate, neopentyl palmitate, nonyl palmitate, cyclohexyl palmitate, n-butyl stearate, 2-methylbutyl stearate, 3,5,5-trimethylhexyl stearate, n-heptyl stearate, n-undecyl stearate, pentadecyl stearate, cyclohexylmethyl stearate, isopropyl behenate, hexyl behenate, lauryl behenate, cetyl benzoate, dimyristyl phthalate, dimyristyl oxalate, dicetyl oxalate, dicetyl malonate, dilauryl succinate, dilauryl glutamate, diundecyl adipate, dilauryl azelate, di-(n-nonyl)sebacate, dineopentyl 1,18-octadecylmethylenedicarboxylate, ethylene glycol dimyristate, propylene glycol dilaurate, 1,5-pentanediol dimyriatate, 1,4-cyclohexanediol didecyl, 1,4-cyclohexanedimethanol dimyristate and xylene glycol dicaprate.

Also effective is an ester compound selected from esters of a saturated fatty acid with a branched aliphatic alcohol, esters of an unsaturated fatty acid or a saturated fatty acid having one or more branches or substituent groups with an aliphatic alcohol having one or more branches or 16 or more carbon atoms, cetyl butyrate, stearyl butyrate and behenyl butyrate.

Illustrative examples include 2-ethylhexyl butyrate, 2-ethylhexyl behenate, 2-ethylhexyl myristate, 2-ethylhexyl caprate, 3,5,5-trimethylhexyl laurate, 3,5,5-trimethylhexyl palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methylpentyl laurate, 2-methylbutyl stearate, 2-methylbutyl stearate, 3-methylbutyl stearate, 1-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1-dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linoleate and behenyl linoleate.

Also effective are a fatty acid ester compound obtained from an aliphatic monohydric alcohol having an odd number of 9 or more carbon atoms and an aliphatic carboxylic acid having an even number of carbon atoms, and a fatty acid ester compound having a total number of 17 to 23 carbon atoms obtained from n-pentyl alcohol or n-heptyl alcohol and an aliphatic carboxylic acid having an even number of 10 to 16 carbon atoms.

Illustrative examples include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate and n-tridecyl stearate.

Examples of the ketones include aliphatic ketones having a total of 10 or more carbon atoms such as 2-decanone, 3-decanone, 4-decanone, 2-undecanone, 3-undecanone, 4-undecanone, 5-undecanone, 6-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone and 2-pentadecanone, and aryl alkyl ketones having a total of 12 to 18 carbon atoms such as n-laurophenone, n-undecanophenone, n-nonanophenone and n-octanophenone.

Examples of the hydrocarbons include pentadecane, hexadecane, heptadecane, octadecane, nonadecane, eicosane, heneicosane, docosane, tricosane, 1-pentadecene, 1-hexadecene, 1-heptadecene, 1-octadecene, 1-nonadecene, 1-eicosene, 1-heneicosene, 1-docosene, 1-tricosene, 1-tetracosene and 1-pentacosene.

In addition, a styrene resin having a weight average molecular weight of from 200 to 65,000 and a softening point of less than 150° C. can be added jointly using a reaction medium selected from the component (c).

As this styrene resin, polystyrene, α-methylstyrene resin, β-methylstyrene resin, vinyl toluene resin and mixed resins thereof can be exemplified.

The component (d) is illustratively described as follows.

Examples of fatty acid esters which can be suitably used as the monomer organic compound having a melting point of 50° C. or more include eicosyl laurate, behenyl laurate, tetracosyl laurate, hexacosyl laurate, octacosyl laurate, cetyl myristate, stearyl myristate, eicosyl myristate, behenyl myristate, tetracosyl myristate, hexacosyl myristate, octacosyl myristate, myristyl palmitate, cetyl palmitate, stearyl palmitate, eicosyl palmitate, behenyl palmitate, tetracosyl palmitate, hexacosyl palmitate, octacosyl palmitate, cetyl stearate, stearyl stearate, eicosyl stearate, behenyl stearate, tetracosyl stearate, hexacosyl stearate, octacosyl stearate, decyl eicosanate, undecyl eicosanate, tridecyl eicosanate, myristyl eicosanate, cetyl eicosanate, stearyl eicosanate, eicosyl eicosanate, docosyl eicosanate, tetracosyl eicosanate, hexacosyl eicosanate, octacosyl eicosanate, methyl behenate, hexyl behenate, octyl behenate, decyl behenate, undecyl behenate, lauryl behenate, tridecyl behenate, myristyl behenate, cetyl behenate, stearyl behenate, eicosyl behenate, behenyl behenate, tetracosyl behenate, hexacosyl behenate and octacosyl behenate.

Examples of the dibasic acid esters include distearyl oxalate, dieicosyl oxalate, behenyl oxalate, distearyl succinate, eicosyl succinate, behenyl succinate, distearyl glutarate, dieicosyl glutarate, behenyl glutarate, dimyristyl adipate, dicetyl adipate, distearyl adipate, eicosyl adipate, behenyl adipate, dicetyl suberate, distearyl suberate, dieicosyl suberate, behenyl suberate, myristyl azelate, dicetyl azelate, distearyl azelate, eicosyl azelate, behenyl azelate, dimyristyl sebacate, dicetyl sebacate, distearyl sebacate, dieicosyl sebacate, dibehenyl sebacate, ditridecyl 1,14-tetradecamethylenedicarboxylate, dimyristyl 1,14-tetradecamethylenedicarboxylate, dicetyl 1,14-tetradecamethylenedicarboxylate, dipalmityl 1,14-tetradecamethylenedicarboxylate, distearyl 1,14-tetradecamethylenedicarboxylate, dieicosyl 1,14-tetradecamethylenedicarboxylate, dibehenyl 1,14-tetradecamethylenedicarboxylate, dilauryl 1,16-hexadecamethylenedicarboxylate, ditridecyl 1,16-hexadecamethylenedicarboxylate, dimyristyl 1,16-hexadecamethylenedicarboxylate, dicetyl 1,16-hexadecamethylenedicarboxylate, dipalmityl 1,16-hexadecamethylenedicarboxylate, distearyl 1,16-hexadecamethylenedicarboxylate, dieicosyl 1,16-hexadecamethylenedicarboxylate, dibehenyl 1,16-hexadecamethylenedicarboxylate, didecyl 1,18-octadecamethylenedicarboxylate, dilauryl 1,18-octadecamethylenedicarboxylate, ditridecyl 1,18-octadecamethylenedicarboxylate, dimyristyl 1,18-octadecamethylenedicarboxylate, dicetyl 1,18-octadecamethylenedicarboxylate, dipalmityl 1,18-octadecamethylenedicarboxylate, distearyl 1,18-octadecamethylenedicarboxylate, dieicosyl 1,18-octadecamethylenedicarboxylate, dibehenyl 1,18-octadecamethylenedicarboxylate, didecyl 1,20-eicosylmethylenedicarboxylate, dilauryl 1,20-eicosylmethylenedicarboxylate, ditridecyl 1,20-eicosylmethylenedicarboxylate, dimyristyl 1,20-eicosylmethylenedicarboxylate, dicetyl 1,20-eicosylmethylenedicarboxylate, dipalmityl 1,20-eicosylmethylenedicarboxylate, distearyl 1,20-eicosylmethylenedicarboxylate, dieicosyl 1,20-eicosylmethylenedicarboxylate, dibehenyl 1,20-eicosylmethylenedicarboxylate, trimyristin, tripalmitin, tristearin, trinonadecanoin, cholesterol caproate, cholesterol caprylate, cholesterol caprate, cholesterol undecanoate, cholesterol laurate, cholesterol myristate, cholesterol palmitate, cholesterol stearate, cholesterol eicosanate and cholesterol behenate.

Examples of aliphatic ketones which are preferably used among ketones include dioctyl ketone, dinonyl ketone, diundecyl ketone, ditridecyl ketone, dipentadecyl ketone, diheptadecyl ketone, dinonadecyl ketone, phenyl octyl ketone, phenyl undecyl ketone, phenyl tridecyl ketone, phenyl pentadecyl ketone and phenyl heptadecyl ketone.

Examples of aliphatic acid amides which are preferred among acid amides include hexylamide, heptylamide, octylamide, nonylamide, decylamide, undecylamide, laurylamide, tridecylamide, myristylamide, palmitylamide, stearylamide, eicosylamide, behenylamide, hexacosylamide and octacosylamide.

Examples of the ether compounds include pentadecyl ether, dihexadecyl ether, dioctadecyl ether, dieicosyl ether and didocosyl ether.

Examples of the fatty acid include myristic acid, pentadecanoic acid, palmitic acid, heptadecanoic acid, stearic acid, nonadecanoic acid, eicosanoic acid, heneicosanoic acid, behenic acid, tricosanoic acid, lignoceric acid, pentacosanoic acid, cerotic acid, octacosanoic acid, nonacosanoic acid and melissic acid.

Examples of the hydrocarbons include tetracosane, pentacosane, hexacosane, heptacosane, octacosane, nonacosane, triacontane, hentriacontane, dotriacontane, tritriacontane, tetratriacontane, 1-tetracosene, 1-pentacosene, 1-hexacosene, 1-heptacosene, 1-octacosene, 1-nonacosene and 1-triacontene.

As the polymer compounds having a softening point of 70° C. or more, acryl copolymer aromatic hydrocarbon resins can be cited, and their illustrative examples include acryl-styrene copolymer resins (trade names Himer SBM100 and Himer SBM73F; mfd. by Sanyo Kasei).

The thermal color development mechanism of the invention is described as follows.

Regarding the homogeneous compatible mixture of the three components (a), (b) and (c), the mixture shows a colored state during heating by transferring into the liquid phase and resulting in a contacting state between (a) and (b) and thereby causing the coloration of (b) to exceed the desensitization of (c), and during temperature fall, the mixture shows a reversible color change behavior in which it returns to a discolored state by dissociation of the bonding of (a) and (b) caused by precipitation of (b).

When a compound selected from gallic acid esters is used as the component (b), it reduces variable color density in the coloration temperature range so that homogeneity of the visual density can be maintained.

Color-changing behavior of the thermally color-developing reversibly thermochromic pigment in which the homogeneous compatible mixture of the three components are encapsulated is described with reference to the illustration of color density-temperature curve in FIG. 1.

In this drawing, temperature $T_1$ indicates coloration initiation temperature, $T_2$ indicates complete coloration temperature, $T_3$ indicates decoloration initiation temperature and $T_4$ indicates complete decoloration temperature.

ΔH is calculated by the following formula as a difference in temperature between the pathway reaching from a discolored state to a colored state and the pathway reaching from a colored state to a discolored state.

$$\Delta H=(T_2-T_1)/2-(T_3-T_4)/2$$

Changes in color density in the color density-temperature curve proceed along the arrows.

The pigment has characteristics in that it shows a discolored state within a temperature range of $T_1$ or less, starts to develop color by the temperature of $T_1$ during the heating step, becomes completely colored state when it reaches the temperature of $T_2$, starts to discolor when it reaches the temperature of $T_3$ during the step in which the temperature is raised to a temperature exceeding $T_2$ and then dropped, becomes thin in the color density when further cooled and completely discolors when reaches the temperature of $T_4$, and that the ΔH value (hysteresis temperature range) shows an optimal ΔH value within the rage of from 7 to 40° C. and the colored state is maintained within the range of ΔH values.

In the system in which a monomer compound having a melting point of 50° C. or more or a polymer compound having a softening point of 70° C. or more is added as a fourth component (d) to the three component system (FIGS. 2 and 3), crystallization in the system is accelerated by the action of the component (d), precipitation rate (whitening) of the gallic acid ester (b) is quickened, decoloration initiation temperature ($T_3$) and complete decoloration temperature ($T_4$) are shifted to high temperature side in comparison with a system to which the component (d) is not added (shown by dotted line), thereby narrowing the ΔH value to limit the ΔH value within a range of from 3 to 25° C., and the narrowing of the coloration temperature-keeping width functions to accelerate quick returning to the original discolored state even after color development by a heating means without applying a special cooling means.

By this function, color changing behavior of coloration and decoloration within the life environmental temperature range can be easily caused, and the color changing operation also satisfies convenience.

For example, the colored state at a temperature of body temperature (36° C.) or of a bath (40° C.) immediately returns to the original discolored state by spontaneous leaving, while, being broad in the ΔH width, the colored state is maintained until cooled to 15 to 10° C. or less in the three component system to which the component (d) is not added.

Figure 4:
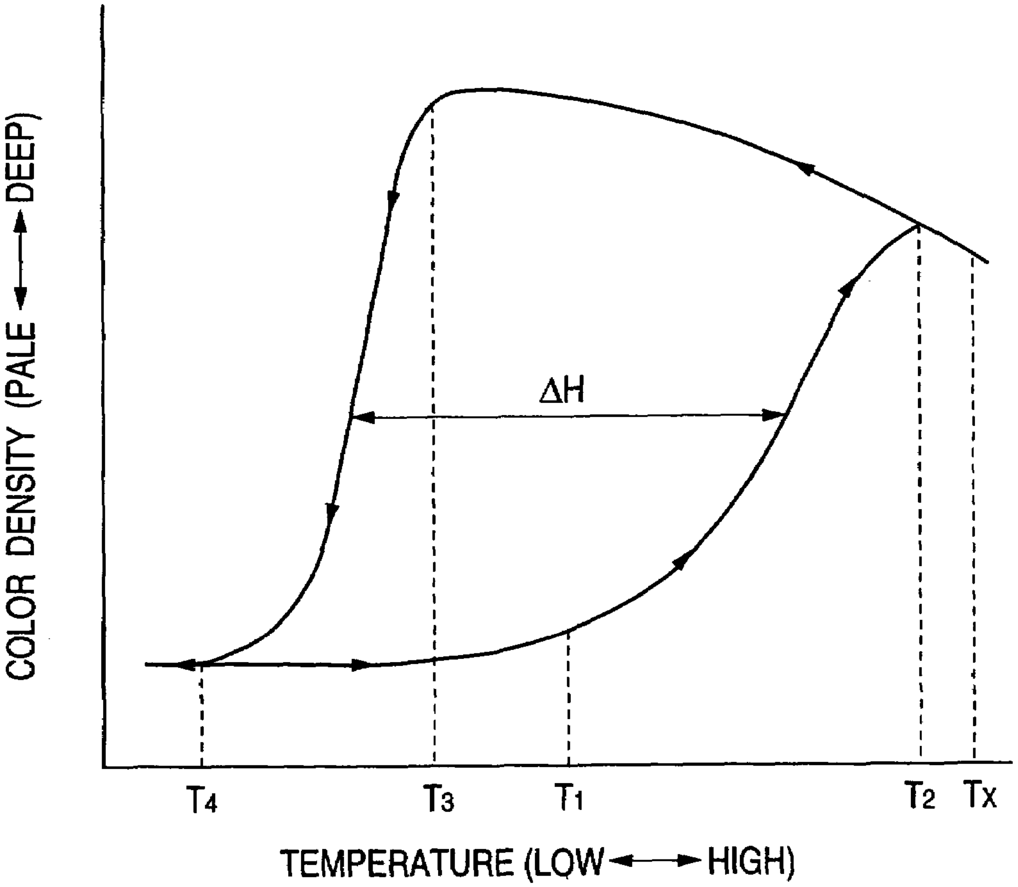
PRIOR ART FIG. 4
FIG. 4 shows a temperature-color density curve of a conventional thermally color-developing reversibly thermochromic material.

FIG. 4 is an explanatory drawing of a color density-temperature curve of the conventional thermally color-developing reversibly thermochromic material, which has a characteristic of having large variable color density within the coloring temperature range, showing a color-changing behavior in which the color density is drastically reduced at a high temperature side ($T_x$) bordering $T_2$ and drastically reduced at a low temperature side reaching the $T_3$ region.

Figure 2:
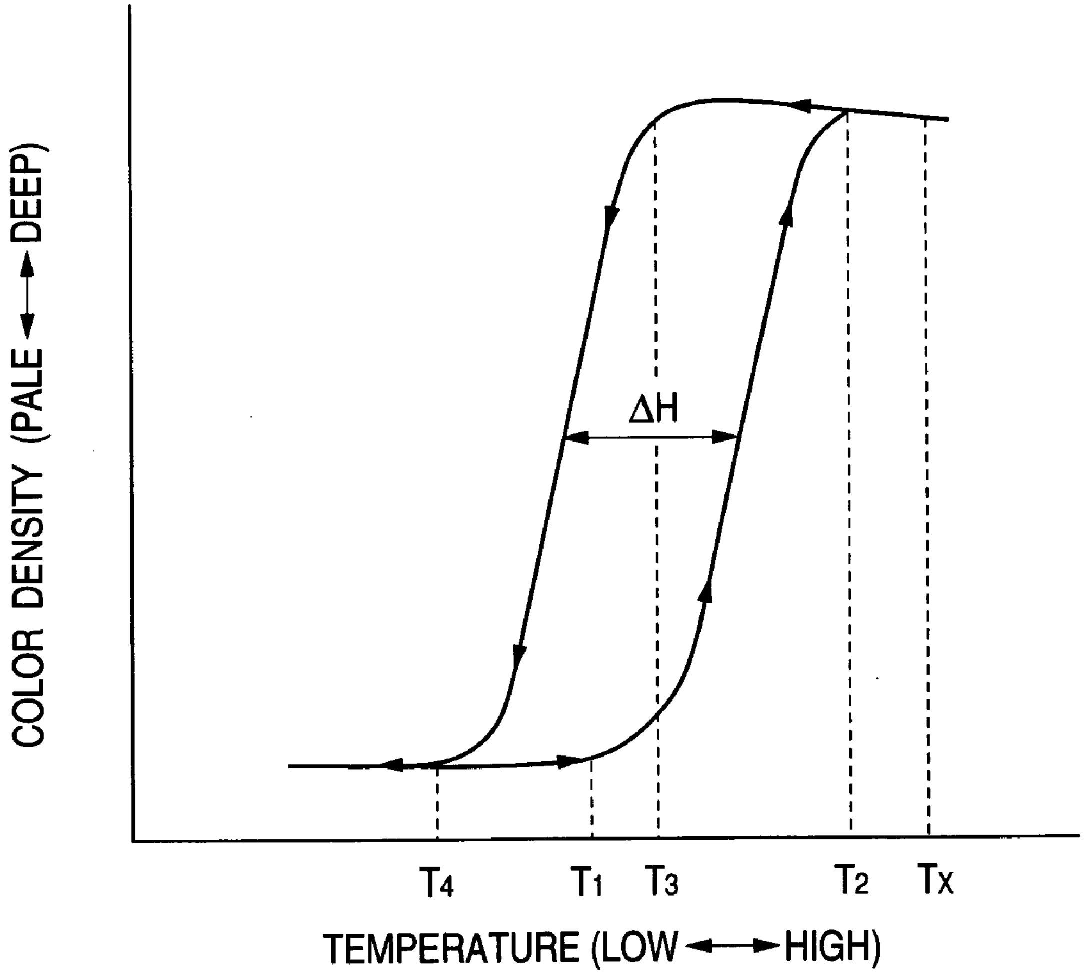
FIG. 2 shows a temperature-color density curve of the four component system ((a), (b), (c) and (d)) among the thermally color-developing reversibly thermochromic pigments of the invention.
Figure 3:
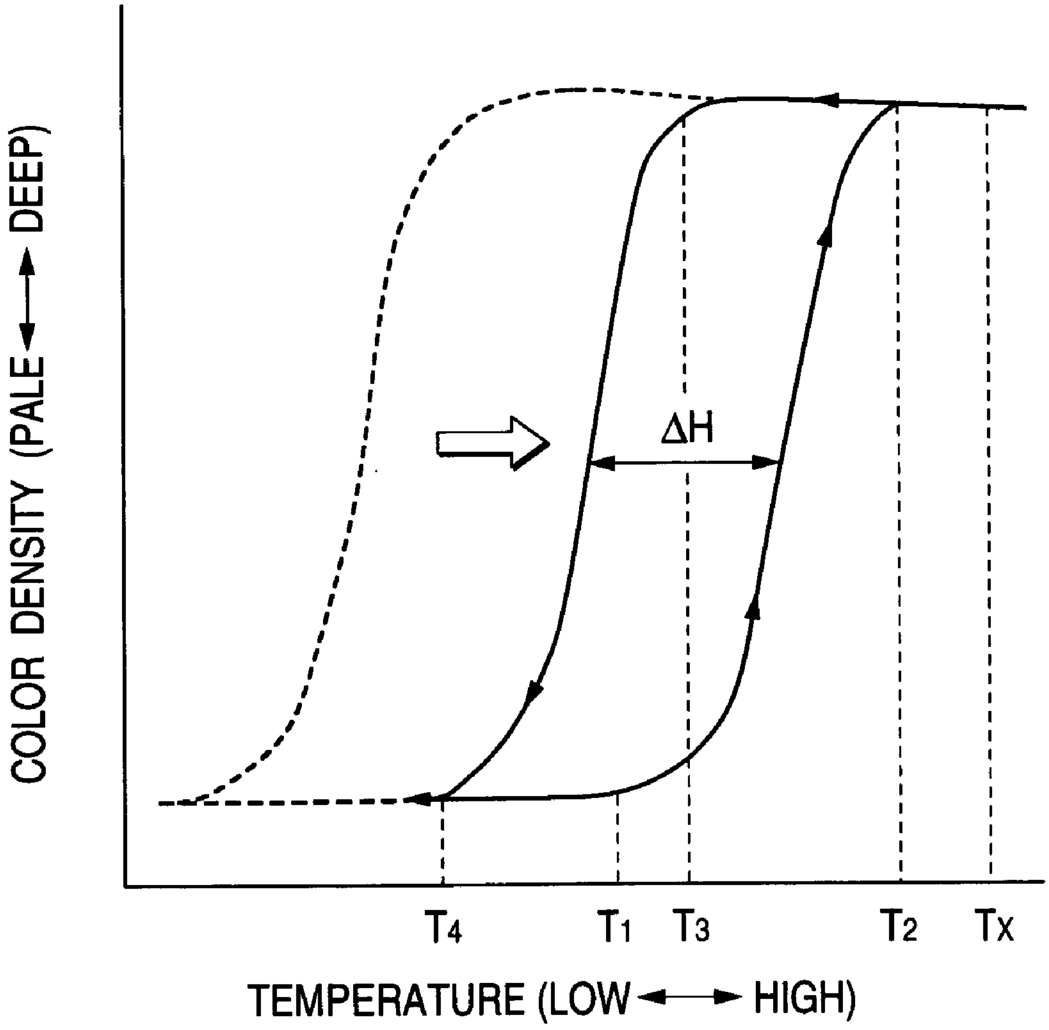
FIG. 3 shows a state when the low temperature side color-changing point is shifted to a high temperature side by formulating the component (d).

Contrary to this, as shown in FIGS. 1 to 3, the thermally color-developing reversibly thermochromic pigment of the invention has an extremely small variable color density within the coloring temperature range and keeps almost the same color density, and in a system in which $T_1$ is 30 to 50° C., a value of $T_2$-$T_1$ is small in comparison with the conventional system, showing a high density coloration behavior.

Formulation ratios of the components are described as follows.

In the three component system, the ratio of component (a) is from 0.2 to 20 (preferably from 0.5 to 15) and that of component (b) is from 10 to 80 (preferably from 20 to 70), based on 100 of the component (c), and in the four component system, a weight ratio of from 0.4 to 20 (preferably from 1 to 10) of component (d) is effective, in addition to the three components.

When ratio of component (b) to component (c) is less than 10% by weight, color density at the time of thermal color development is practically insufficient, and when it exceeds 80% by weight, reversibility of dissolution-precipitation in component (c) is apt to be spoiled due to the presence of excess amount of component (b), so that reversible coloration and decoloration cannot be obtained easily and decoloration is also poor.

When ratio of component (d) to component (c) is less than 0.4, shifting effect of the low temperature side color change curve to the high temperature side is insufficient, and when it exceeds 20% by weight, optimum balance between coloration and decoloration is spoiled.

Component (c) may be a single system of the compound described in the foregoing, but may also be a joint use system of alcohols and esters, a joint use system of alcohols and hydrocarbons or a joint use system of alcohols and styrene resins is effective, and this point is described as follows.

In the encapsulated composition comprising the four components, changes in the property of the gallic acid ester (b), namely dissolved condition at the time of heating (at the time of high temperature) and precipitated condition at the time of cooling (at the time of low temperature), undergo influences of chemical properties and physical properties of the component (c).

Particularly in alcohols, rather than the coloring strength of the gallic acid ester (b), a force to negate the strength, namely desensitizing power of alcohols, is exerted, thus showing a characteristic to reduce color density of the encapsulated composition.

On the other hand, their joint use system with esters, carbohydrates or styrene resins has characteristics in that their desensitizing power is weak in comparison with alcohols in their dissolved condition at the time of heating (at the time of high temperature) and their influence on the coloring strength of the gallic acid ester (b) is small, thus showing good color density, and at the time of cooling (at the time of low temperature), a precipitation phenomenon of the gallic acid ester (b) hardly occurs and change into discolored state hardly occurs.

As described in the foregoing, both of the good colored states at the time of heating (at the time of high temperature) and the discolored state at the time of cooling (at the time of low temperature) can be effectively expressed through well-balanced combination of both characteristics of a jointly used preparation of an alcohol with a compound selected from esters, carbohydrates or styrene resins.

The mixing ratio of the alcohols and esters is an alcohols/esters weight ratio of from 80/20 to 20/80 (preferably from 70/30 to 30/70, more preferably from 60/40 to 40/60).

Also, the joint use system of alcohols and hydrocarbons has a characteristic of being large in color density in comparison with the joint use system with esters. The mixing ratio of the hydrocarbons with alcohols is an alcohols/hydrocarbons weight ratio of from 80/20 to 20/80 (preferably from 70/30 to 30/70, more preferably from 60/40 to 40/60).

In addition, the joint use system of alcohols and styrene resins has a characteristic of being small in residual color under discolored state, in comparison with the alcohols alone or the joint use system of alcohols with esters or hydrocarbons. The mixing ratio of the styrene resins with the alcohols is an alcohols/styrene resins weight ratio of from 90/10 to 5/95 (preferably from 80/20 to 10/90, more preferably from 60/40 to 40/60).

The homogeneous compatible mixture of the three component system or four component system is contained in microcapsules to constitute the thermally color-developing reversibly thermochromic pigment.

In this case, in order to add security against light, various conventionally known ultraviolet ray absorbents can be applied by blending them with the homogeneous compatible mixture. The ultraviolet ray absorbent can be formulated in an amount of from 1 to 40% by weight (preferably from 1 to 30% by weight, more preferably from 5 to 15% by weight), based on the entire encapsulated composition. When the amount is less than 1% by weight, the light resistance improving effect is insufficient, and the amount exceeding 40% by weight causes an obstacle to the thermally color-changing function.

The microcapsules satisfy their practical use when the average particle diameter is within the range of from 0.5 to 50 μm, preferably from 1 to 30 μm, more preferably from 3 to 20 μm.

When the microcapsules are a system having an average major diameter of exceeding 50 μm, dispersion stability and processing ability become insufficient in blending them with an ink, paint or thermoplastic resin.

On the other hand, it is difficult to show high density coloration by a system having an average major diameter of less than 0.5 μm, so that it is preferable that the average major diameter is within the range of from 1 to 30 μm, and the average particle diameter of the microcapsules ((maximum major diameter+minimum major diameter)/2) is within the range of from 3 to 20 μm.

In this case, the shape of the microcapsules may have a completely round section, but a non-round section having an indentation is more effective, because it can alleviate stress against the load of heat and pressure by appropriately performing elastic deformation, and destruction of the wall membrane can be inhibited.

In the microcapsules, it is effective when the encapsulated components/wall membrane is within the range of from 7/1 to 1/1 (weight ratio), and reduction of color density and clearness at the time of color development cannot be avoided when the ratio of the encapsulated components is larger than this range, so that the encapsulated components/wall membrane is preferably within the range of from 6/1 to 1/1 (weight ratio).

In this connection, there are conventionally known methods for microencapsulation, such as interfacial polymerization of an isocyanate system, in situ polymerization such as of a melamine-formalin system, in-liquid curing coating, phase separation from an aqueous solution, phase separation from an organic solvent, melt dispersion cooling, air-suspension coating and spray drying, which may be selected according to the intended use. Before the microcapsules are subjected to practical use, the surface thereof may be coated with an additional resin film to thereby impart durability or modify the surface properties according to purposes.

In this connection, when blended with a general dye or pigment (not thermally color changing), the thermally color-developing reversibly thermochromic pigment of the invention can show a color-changing behavior from a color (1) to a color (2).

MODE FOR CARRYING OUT THE INVENTION

The thermally color-developing reversibly thermochromic pigment of the invention can be applied to liquid compositions such as printing ink, writing ink, colors, paints, cosmetics for manicure, cosmetics for make up, cosmetics for hair and coloring liquid for fibers, by dispersing it in vehicles containing known binder resins or additives. Also, thermally color-developing laminates can be obtained from the liquid compositions by forming thermally color-developing reversibly thermochromic layers on the surface of various supports such as papers, plastic sheets, leather and cloth or on the surface of moldings such as cups, bottles and toys, by conventionally known methods including printing means such as screen printing, offset printing, gravure printing, coater, pad printing and transfer and coating means such as brush coating, spray coating and electrostatic coating.

Examples of the binder resins include synthetic resins such as an ionomer resin, an isobutylene-maleic anhydride copolymer resin, an acrylonitrile-acrylic styrene copolymer resin, an acrylonitrile-styrene copolymer resin, an acrylonitrile-butadiene-styrene copolymer resin, an acrylonitrile-chlorinated polyethylene-styrene copolymer resin, an ethylene-vinyl chloride copolymer resin, an ethylene-vinyl acetate copolymer resin, an ethylene-vinyl acetate copolymer resin, an ethylene-vinyl acetate-vinyl chloride graft copolymer resin, a vinyl acetate resin, a vinyl chloride resin, a vinylidene chloride resin, a chlorinated vinyl chloride resin, a vinyl chloride-vinylidene chloride copolymer resin, a chlorinated polyethylene resin, a chlorinated polypropylene resin, a polyamide resin, a polycarbonate resin, polybutadiene, a polyethylene terephthalate resin, a polybutylene terephthalate resin, a polystyrene resin, a high impact polystyrene resin, a styrene-maleic acid copolymer resin, an acryl-styrene copolymer resin, a polypropylene resin, a polymethylstyrene resin, an acrylic acid ester resin, a polymethyl methacrylate resin, an epoxy acrylate resin, an alkylphenol resin, a rosin-modified phenol resin, a rosin-modified alkyd resin, a phenol resin-modified alkyd resin, a styrene-modified alkyd resin, an epoxy resin-modified alkyd resin, an acryl-modified alkyd resin, an aminoalkyd resin, a butyral resin, a polyurethane resin, a vinyl chloride-vinyl acetate copolymer resin, an epoxy resin, an alkyd resin, a styrene-butadiene copolymer resin, an unsaturated polyester resin, a saturated polyester resin, a vinyl chloride-acryl copolymer resin, polyisobutylene, butyl rubber, cyclized rubber, chlorinated rubber, a polyvinyl alkyl ether, a fluorine resin, a silicon resin, a phenol resin, a petroleum system hydrocarbon resin, a ketone resin, a toluene resin, a xylene resin, a melamine resin, a urea resin, a benzoguanamine resin, polyethylene oxide, polyvinyl pyrrolidone, a vinyl pyrrolidone-vinyl acetate copolymer resin, polyvinyl alcohol, a modified polyvinyl alcohol, a polyacrylic acid salt, a polymethacrylic acid salt, an acrylic acid ester copolymer emulsion, a methacrylic acid ester system copolymer emulsion, a vinyl acetate-acrylic acid ester copolymer emulsion, an ethylene-vinyl acetate copolymer emulsion, a styrene-acrylic acid ester copolymer emulsion, a vinyl chloride system copolymer emulsion, a vinylidene chloride system copolymer emulsion, a polyvinyl acetate emulsion, a polyolefin system emulsion, a rosin ester emulsion, an epoxy resin emulsion, a polyurethane system emulsion and a synthetic rubber latex; synthetic medium molecular weight polymers such as a low molecular weight polyethylene, a low molecular weight polypropylene, a low molecular weight polystyrene, a cumarone plastic, a polybutene, a phenoxy plastic, a liquid polybutadiene, a liquid rubber, a petroleum system hydrocarbon resin and a cyclopentadiene system petroleum resin; and natural or semi-synthetic resins such as a cellulose derivative, an alginic acid derivative, a rosin derivative, starches, polysaccharides, rubbers, natural rubber, shellac, agar, casein, glue, gelatin and polyterpene.

Since these resins are solid at room temperature, excluding the resin emulsions, a part of the medium molecular weight polymers and a part of reactive resins such as epoxy resins, they can be made into liquids by dissolving or dispersing in solvents such as water, aliphatic hydrocarbons, aromatic hydrocarbons, alcohols, glycols, glycol derivatives, esters and ketones, and liquid compositions are prepared by adding various additives as the occasion demands.

Examples of these additives include a non-thermochromic coloring agent, a crosslinking agent, a curing agent, a drying agent, a plasticizer, a viscosity adjusting agent, a dispersing agent, an ultraviolet ray absorbent, an antioxidant, a light stabilizer, a precipitation inhibitor, a lubricant, a gelling agent, an antifoaming agent, a flatting agent, a penetrating agent, a pH adjusting agent, a foaming agent, a coupling agent, a moisture keeping agent, a fungicide and an anticorrosion agent.

In addition, thermally color-developing moldings can be obtained from the thermally color-developing reversibly thermochromic pigment of the invention by blending and integrating it with a resin for molding together with the additives, if necessary, and processing the integrated product into desired shapes such as pellets and then molding the processed product into moldings having various shapes, such as films, sheets, plates, rods, pipes and filaments, using various molding machines such as for calender roll processing, extrusion molding and injection molding.

Examples of the resins for molding include thermoplastic resins such as linear low density polyethylene, low density polyethylene, medium to high density polyethylene, ultrahigh density polyethylene, chlorinated polyethylene, polypropylene, chlorinated polypropylene, polyisobutylene, polybutadiene, polymethylpentene, polystyrene, polyethylene terephthalate, polybutylene terephthalate, polyvinyl acetate, a vinyl chloride resin, chlorinated polyvinyl chloride, polyvinylidene chloride, an acrylic acid ester resin, a methacrylic acid ester resin, polyamide, a copolymer polyamide, polyamidoimide, polyacetal, polyvinyl formal, polyvinyl butyral, polyallylate, polyether imide, polyether ethyl ketone, polycarbonate, polyphenyl ether, polyphenylene sulfide, polysulfone, a fluoride resin, an ionomer resin, an ethylene-propylene copolymer resin, an ethylene-vinyl acetate copolymer resin, an ethylene-vinyl alcohol copolymer resin, an ethylene-acrylic acid ester copolymer resin, an ethylene-methacrylic acid ester copolymer resin, an ethylene-vinyl chloride copolymer resin, a vinyl chloride-propylene copolymer resin, a vinyl chloride-vinylidene chloride copolymer resin, a styrene-butadiene copolymer resin, an acrylonitrile-vinylidene chloride copolymer resin, an acrylonitrile-styrene copolymer resin, an acrylonitrile-ethylene-styrene copolymer resin, an acrylonitrile-butadiene-styrene copolymer resin, an acrylonitrile-chlorinated polyethylene-styrene copolymer resin, an acrylonitrile-acrylic acid ester-styrene copolymer resin, an ethylene-vinyl acetate resin-vinyl chloride graft copolymer resin, a methyl methacrylate-butadiene-styrene copolymer resin, a styrene system thermoplastic elastomer, an olefin system plasticity elastomer, a urethane system plasticity elastomer, a polyester system plasticity elastomer, a 1,2-polybutadiene system plasticity elastomer, a vinyl chloride system plasticity elastomer, a petroleum system hydrocarbon resin, cellulose acetate, cellulose acetate propionate, cellulose acetate butyrate, nitrocellulose, low molecular weight polyethylene, low molecular weight polypropylene, polybutene, a cumarone-indene copolymer and a phenoxy plastic; and thermosetting resins such as an epoxy resin, a xylene resin, a toluene resin, a guanamine resin, an epoxy acrylate, a phenol resin, an unsaturated polyester resin, a furan resin, polyimide, poly(p-hydroxybenzoic acid), polyurethane, a urea resin, a melamine resin and a silicone resin.

In addition, light resistance can be improved by laminating a layer containing a light stabilizer and/or a light-shading pigment on the thermochromic layer of the laminates or the moldings, or durability can be improved by arranging a topcoat layer thereon.

Examples of the light-shading pigment include pigments such as metallic luster pigment, transparent titanium dioxide, transparent iron oxide, transparent cesium oxide and transparent zinc oxide.

Using each of the compositions in Examples (1 to 10) of the microencapsulated thermally color-developing reversibly thermochromic pigment of the invention, shown in Tables 1 to 3, microencapsulation was carried out using an isocyanate system resin as the wall membrane material, in such a manner that the composition was contained in microcapsules.

Color changing characteristics of the obtained microcapsule pigments are shown in Table 4.

TABLE 1

| Ex. No. | Components [each numeral in ( ) indicates blended amount (part(s) by weight)] (a) | (b) | (c) | (d) | UV ray absorbent |
|---|---|---|---|---|---|
| 1 | 2-(dibutylamino)-8-(dipentylamino)-4-methyl-spiro [5H-[1]benzopyrano[2,3-g]pyrimidine-5,1' (3H)-isobenzofuran]-3-one (1) | stearyl gallate (8) | n-heptyl stearate (10.0) myristyl alcohol (15.0) | — | 2-(3-t-butyl-5-methyl-2-hydroxyphenyl)-5-chlorobenzotriazole (3.0) |
| 2 | 9-ethyl-(3-methylbutyl)amino-spiro[12H-benzo(a)xanthene-[2,1'(3'H)isobenzofuran]-3'-one (2) | tetradecyl gallate (8) | cetyl caprate (20.0) myristyl alcohol (5.0) | — | 2-(5-t-butyl-2-hydroxyphenyl) benzotriazole (1.0) |
| 3 | 2-(dibutylamino)-8-(dipentylamino)-4-methyl-spiro[5H-[1]benzopyrano[2,3-g]pyrimidine-5,1'(3H)-isobenzofuran]-3-one (1) | dodecyl gallate (8) | stearyl laurate (12.5) lauryl alcohol (12.5) | — | 2-(3-t-butyl-5-methyl-2-hydroxyphenyl)-5-chlorobenzotriazole (3.0) |
| 4 | 9-ethyl-(3-methylbutyl)amino-spiro[12H-benzo(a)xanthene-[12,1'(3'H)isobenzofuran]-3'-one (2) | tetradecyl gallate (8) | myristyl alcohol (5.0) α methylstyrene-β methylstyrene-vinyl toluene resin mixture (20.0) [Ligalets 1018, mfd. by Rika Hercules] Softening point: 14° C. | — | 2-(5-t-butyl-2-hydroxyphenyl) benzotriazole (1.0) |

TABLE 2

| Ex. No. | Components [each numeral in ( ) indicates blended amount (part(s) by weight)] (a) | (b) | (c) | (d) | UV ray absorbent |
|---|---|---|---|---|---|
| 5 | 2-(dibutylamino)-8-(dipentylamino)-4-methyl-spiro[5H-[1]benzopyrano[2,3-g]pyrimidine-5,1'(3H)-isobenzofuran]-3-one (1) | docecyl gallate (8) | n-heptyl stearate (12.5) lauryl alcohol (12.5) | octadecyl ether (1) Melting point: 60° C. | 2-(3-t-butyl-5-methyl-2-hydroxyphenyl-5-chlorobenzotriazole (3.0) |
| 6 | 9-ethyl-(3-methylbutyl)amino-spiro[12H-benzo(a)xanthene-12,1'(3'H)isobenzofuran]-3'-one (2) | stearyl gallate (8) | cetyl caprate (20.0) myristyl alcohol (5.0) | Acryl-styrene copolymer resin Himer SBM 100 (mfd. by Sanyo Kasei) Softening point: 104° C. | 2-(5-t-butyl-2-hydroxyphenyl)-benzotriazole (1.0) |
| 7 | 6'-[ethyl-(4-methylphenyl)amino]-2'-(methylphenylamino)-sprio[isobenzofuran-1(3H),9'-(9H)xanthen]-3-one (4.5) | dodecyl gallate (8) | cetyl caprate (6.25) myristyl alcohol (12.5) styrene resin (6.25) [Picolastic A-5, mfd. by Rika Hercules] Softening point: 5° C. | behenyl behenate (1) Melting point: 76° C. | 2-(3-t-butyl-5-methyl-2-hydroxyphenyl)-5-chlorobenzotriazole (3.0) |

TABLE 3

| Ex. No. | Components [each numeral in ( ) indicates blended amount (part(s) by weight)] (a) | (b) | (c) | (d) | UV ray absorbent |
|---|---|---|---|---|---|
| 8 | 3-[2-ethoxy-4-(N-ethylanilino)phenyl]-3-(1-ethyl-2-methyl-3-indolyl-4-azaphthalide (2) | stearyl gallate (10) | stearyl caprate (8.75) n-docosane (8.75) lauryl alcohol (7.50) | octadecyl ether (1) Melting point: 60° C. | 2-(5-t-butyl-2-hydroxyphenyl)-benzotriazole (2.0) |

TABLE 3-continued

| Ex. No. | Components [each numeral in ( ) indicates blended amount (part(s) by weight)] (a) | (b) | (c) | (d) | UV ray absorbent |
|---|---|---|---|---|---|
| 9 | 9-ethyl(3-methylbutyl)amino-spiro[12H-benzo(a)xanthene-12,1'(3'H)-isobenzofuran]-3'-one (2) | dodecyl gallate (3) stearyl gallate (5) | n-heptyl stearate (8.75) n-docosane (8.75) lauryl alcohol (7.50) | behenic acid amide (1) Melting point: 115° C. | 2-(3-t-butyl-5-methyl-2-hydroxyphenyl)-5-chlorobenzotriazole (1.5) |
| 10 | 9-ethyl(3-methylbutyl)amino-spiro[12H-benzo(a)xanthene-12,1'(3'H)-isobenzofuran]-3'-one (2) | dodecyl gallate (3) stearyl gallate (5) | n-heptyl stearate (5.25) n-docosane (5.25) lauryl alcohol (7.50) vinyl toluene resin (7.00) [Picolatex 100, mfd. by Rika Hercules] Softening point: 98° C. | behenic acid amide (1) Melting point: 115° C. | 2-(3-t-butyl-5-methyl-2-hydroxyphenyl)-5-chlorobenzotriazole (1.5) |

TABLE 4

| Ex. No. | Changes in color | Color changing temp. (° C.) $T_1$ | $T_2$ | $T_3$ | $T_4$ | ΔH (° C.) |
|---|---|---|---|---|---|---|
| 1 | pink ←→ colorless | 30 | 40 | 16 | 8 | 23 |
| 2 | magenta ←→ colorless | 43 | 60 | 31 | 22 | 25 |
| 3 | pink ←→ colorless | 28 | 43 | 32 | 24 | 8 |
| 4 | magenta ←→ colorless | 43 | 55 | 20 | 12 | 30 |
| 5 | pink ←→ colorless | 30 | 40 | 30 | 22 | 9 |
| 6 | magenta ←→ colorless | 43 | 58 | 46 | 38 | 9 |
| 7 | green ←→ colorless | 34 | 43 | 36 | 24 | 11 |
| 8 | blue ←→ colorless | 44 | 60 | 34 | 30 | 20 |
| 9 | magenta ←→ colorless | 30 | 52 | 32 | 20 | 15 |
| 10 | magenta ←→ colorless | 30 | 52 | 23 | 14 | 17 |

Next, the measuring sample is described. In this connection, the term "part(s)" indicates part(s) by weight.

Using an ink obtained by dispersing 40 parts of each of the thermochromic pigments of Examples 1 to 10 in an ethylene-vinyl acetate emulsion under stirring, an image was printed on wood-free paper by screen printing, and color changing characteristics of each Example were measured using the printed matter as the measuring sample.

Measuring Method

The measuring sample was set to the fixed place of a color-difference meter (TC-3600 Color-Difference Meter, mfd. by Tokyo Denshoku) and heated and cooled at a rate of 10° C./min with a temperature width of 60° C., and lightness values displayed on the color-difference meter at respective temperatures were plotted.

APPLICATION EXAMPLE 1

An ink was obtained by stirring and mixing 50 parts of the pigment prepared in Example 6, 14 parts of an acryl resin emulsion, 35 parts of a styrene-acryl copolymer resin aqueous solution and 1 part of an antifoaming agent, and a character of "hot, be careful" was formed by gravure printing on a coat cup base paper whose backside had been treated with polyethylene coating.

The obtained cup was solid in color at ordinary temperature, but a magenta-colored character of "hot, be careful" was formed when a tea of 70° C. was poured, and it changed again into the original solid color state when returned to ordinary temperature.

APPLICATION EXAMPLE 2

An epoxy ink was obtained by adding 20.0 parts of a cold setting aliphatic polyamine to an ink obtained by uniformly dispersing and mixing 33.3 parts of the pigment prepared in Example 8, 66.4 parts of a liquid epoxy resin and 3.0 parts of an antifoaming agent, and mixing the components under stirring.

The surface of a ceramic cup was treated with a curved-surface printing using a stainless steel 150 mesh screen and then subjected to heat-curing at 70° C. for 60 minutes to arrange a thermochromic layer.

The thermochromic layer became blue when heated to 60° C. or more and returned to colorless at 30° C. or less.

APPLICATION EXAMPLE 3

A water-color ink for ball-point pen use was prepared by uniformly dispersing and mixing 44.0 parts of the thermochromic composition-containing microencapsulated pigment prepared in Example 3 in 56.0 parts of an aqueous vehicle containing a shear viscosity thinning agent.

When a pattern was written on a report paper using a ball-point pen charged with the ink for ball-point pen use, a handwriting of markedly thin pink color was obtained with good beginning.

In this connection, when the handwriting was rubbed with an eraser or a finger, it showed a pink color and returned to colorless at a room temperature of 20° C.

APPLICATION EXAMPLE 4

A spray paint was obtained by stirring and mixing 15.0 parts of the thermochromic composition-containing microencapsulated pigment prepared in Example 7, 1.0 part of a red pigment, 40.0 parts of a 50% acryl resin/xylene solution, 20.0 parts of xylene, 20.0 parts of methyl isobutyl ketone and 6.0 parts of a polyisocyanate system curing agent in a vehicle.

A thermochromic miniature car was obtained by applying spray coating of the thermochromic spray paint to the entire body of a miniature car and then drying the paint.

This miniature car became black when heated to 45° C. or more and changed to red at less than 25° C.

APPLICATION EXAMPLE 5

Thermochromic (6,12-copolymer nylon resin) pellets were obtained by mixing 50 parts of the thermochromic composition-containing microencapsulated pigment prepared in Example 5 with 1,000 parts of a 6,12-copolymer nylon resin (melting point 150° C.) and 10 parts of an ultraviolet ray absorbent, uniformly dispersing them using Henschel mixer, and then molding the dispersion using an extrusion molding machine.

Using the pellets as the material, thermochromic filaments were obtained by carrying out melt spinning.

The thermochromic filaments became pink when heated to 40° C. or more and returned to colorless at less than 20° C.

According to the thermally color-developing reversibly thermochromic pigment of the invention, variable color density in the coloring temperature range is small and an optional ΔH value within a range of from 3 to 40° C. of the ΔH value (hysteresis temperature range) in the temperature-color density curve can be selected. Illustratively, those having a ΔH value within a range of from 7 to 40° C. in the three component system and a ΔH value within a range of from 3 to 25° C. in the four component system can be put into practical use in response to purposes.

In the four component system, a color is developed by a heating means by narrowing the ΔH value and narrowing the temperature keeping temperature width through shifting of the decoloration initiation temperature width of the three component system to more higher temperature side, and then the color can be quickly returned to the original discolored state without applying a special cooling means.

Also, since the thermally color-developing reversibly thermochromic pigment of the invention has resistances to heat and pressure, in addition the color changing characteristics, it is possible to develop its new applications not only in the fields of temperature indication and temperature detection as a matter of course but also other fields such as of toys, teaching materials, various cards, food and drink containers, packing materials, household utensils, clothing, decorations and designing.

Particularly, in the case of certain products such as cups, toys for bathing and training elements, a heat-developed image can be obtained easily and returned to the original state by spontaneous cooling, so that their commercial values can be improved. In addition, various changes in color can be realized through its combination with a heat-discoloring thermally color-changing material.

While the invention has been described in detail and with reference to specific embodiments thereof, it will be apparent to one skilled in the art that various changes and modifications can be made therein without departing from the scope thereof.

This application is based on Japanese patent applications No. 2001-395841 filed Dec. 27, 2001 and No. 2002-045108 filed Feb. 21, 2002, the entire contents thereof being hereby incorporated by reference.

What is claimed is:

1. A thermally color-developing reversibly thermochromic pigment which shows a colored state upon heating from a discolored state and returns to the discolored state upon cooling from the colored state, said thermally color-developing thermochromic pigment consisting essentially of at least (a) an electron-donating chromic organic compound, (b) an electron-accepting compound selected from gallic acid esters and (c) a reaction medium which reversibly generates color reactions of both of the compounds within a specified temperature range, which has a melting point of less than 50° C., and which comprises one or more alcohols and one or more esters, and the weight ratio of alcohols/esters is from 80/20 to 20/80, wherein these three essential components are contained in microcapsules having an average particle diameter of from 0.5 to 50 μm, and has a ΔH value within a range of from 3 to 40° C.

2. A thermally color-developing reversibly thermochromic pigment which shows a colored state upon heating from a discolored state and returns to the discolored state upon cooling from the colored state, said thermally color-developing thermochromic pigment consisting essentially of at least (a) an electron-donating chromic organic compound, (b) an electron-accepting compound selected from gallic acid esters and (e) a reaction medium which reversibly generates color reactions of both of the compounds within a specified temperature range, which has a melting point of less than 50° C., and which comprises one or more alcohols and one or more hydrocarbons, and the weight ratio of alcohols/hydrocarbons is from 80/20 to 20/80, wherein these three essential components are contained in microcapsules having an average particle diameter of from 0.5 to 50 μm, and has a ΔH value within a range of from 3 to 40° C.

3. The thermally color-developing reversibly thermochromic pigment according to claim 1 or 2, which further consists essentially of a compound (d) selected from the group consisting of monomer compounds having a melting point of 50° C. or more and polymer compounds having a softening point of 70° C. or more, and the ΔH value is within a range of from 3 to 25° C.

4. The thermally color-developing reversibly thermochromic pigment according to claim 3, wherein component (d) is present from 0.4 to 20% by weight related to component (c).

5. The thermally color-developing reversibly thermochromic pigment according to claim 1 or 2, wherein the ΔH value is within a range of from 7 to 40° C.

6. The thermally color-developing reversibly thermochromic pigment according to claim 1 or 2, wherein component (b) is present from 20 to 80% by weight relative to the component (c).

* * * * *